United States Patent
Bader et al.

[11] Patent Number: 5,972,496
[45] Date of Patent: Oct. 26, 1999

[54] FILM STRUCTURE

[75] Inventors: Michael J. Bader, Fairport; Susan S. Crane, Macedon; James A. Johnson, Jr., Canandaigua; Francis D. Tran, Fairport, all of N.Y.

[73] Assignee: Mobil Oil Corporation, Fairfax, Va.

[21] Appl. No.: 08/842,105

[22] Filed: Apr. 28, 1997

[51] Int. Cl.⁶ .................................................. B32B 5/16
[52] U.S. Cl. ........................ 428/331; 428/405; 428/461; 428/515; 428/516; 428/523

[56] References Cited

U.S. PATENT DOCUMENTS

| | | | |
|---|---|---|---|
| 4,594,134 | 6/1986 | Hanada et al. | 522/99 |
| 4,652,618 | 3/1987 | Sumida et al. | 525/478 |
| 4,769,418 | 9/1988 | Mizuno et al. | 525/106 |
| 4,855,187 | 8/1989 | Osgood, Jr. et al. | 428/516 |
| 4,966,933 | 10/1990 | Kawakami et al. | 524/310 |
| 5,194,318 | 3/1993 | Migliorini | 428/215 |
| 5,681,043 | 11/1997 | Keller | 428/212 |
| 5,725,862 | 3/1998 | Boder | 428/515 |
| 5,753,363 | 5/1998 | Bader | 428/331 |

*Primary Examiner*—Leszek Kiliman
*Attorney, Agent, or Firm*—Dennis P. Santini

[57] ABSTRACT

A film structure comprises a first sealable skin layer (a) of an olefin co- or terpolymer having an external surface which contains a slip/antiblock system. The slip/antiblock system comprises non-migratory particulate crosslinked hydrocarbyl substituted polysiloxane and silica antiblock particles. Layer (a) is located on one side of a core olefinic polymer layer (b). On an opposite side of the core layer (b) there is a second skin layer (c) which is ethylene homopolymer and which is free of the slip/antiblock system, optionally the second skin layer (c) is metallized.

10 Claims, No Drawings

FILM STRUCTURE

FIELD OF THE INVENTION

This invention relates to the field of polymer films. It more particularly relates to a sealable biaxially oriented composite film structure in which the sealable skin layer contains particulate slip/antiblock system. In one aspect, the film is metallized.

BACKGROUND OF THE INVENTION

In the packaging of certain types of foods, such as snack foods including candies, potato chips, cookies and the like, it is common practice to employ a multi-layer film. Polypropylene films are widely used in the packaging industry due to their superior physical properties, such as, transparency, stiffness, moisture barrier characteristics and others. Despite these highly desirable properties, unmodified polypropylene film has the disadvantageous property of having a high inherent coefficient of friction and film-to-film destructive blocking on storage. This high film-to-film coefficient of friction makes polypropylene films difficult to be successfully employed in automatic packaging equipment in their unmodified form.

Coefficient of friction characteristics of polypropylene and other thermoplastic films are beneficially modified by the inclusion in the polymer of slip agents. Most of these slip agents are migratory, such as polydialkyl siloxane or fatty amides, such as, erucamide and oleamide. Although they do reduce the coefficient of friction, their effectiveness depends upon the ability to migrate to the surface of the film. The development of the desired low coefficient of friction value is strongly dependent upon the type and amounts of amides, and time and temperature aging effects. Even the heat history of the film while in storage and shipping and during subsequent converter processes, significantly affects the coefficient of friction. In addition, the presence of these types of fatty acid amides on the film surface results in visible adverse appearance effects, manifested by an increase in haze, a decrease in gloss and the presence of streaks. These materials also adversely effect the wettability and adhesion of solvent and water-based inks, coatings and adhesives.

To overcome the problems associated with migratory slip agents, non-migratory systems were developed. A material described to be a non-migratory slip agent is a particulate crosslinked hydrocarbyl-substituted polysiloxane which is available worldwide from Toshiba Silicone Co., Ltd. and in the United States from General Electric Co. And marketed under the name TOSPEARL In PCT US94/14280 a film structure containing a non-migratory particulate crosslinked hydrocarbyl-substituted polysiloxane slip agent is described. The film structure includes at least one layer of an olefin homo-, co- or terpolymer having a surface-treated external surface which is printable, sealable and machinable and as combined slip agent and antiblock a non-migratory particulate crosslinked hydrocarbyl-substituted polysiloxane, and/or liquid polydimethyl siloxane.

Additional descriptions of olefinic polymer films in which particulate siloxane resins are employed to provide improved films will be found in U.S. Pat. Nos. 4,966,933; 4,769,418; 4,652,618; and 4,594,134.

U.S. Pat. No. 4,966,933 describes a propylene polymer film containing 100 parts by weight of a propylene polymer, 0.01 to 0.5 parts by weight of a fine powder of a crosslinked silicone resin and 0.3 to 3.0 parts by weight of a hydroxy-fatty acid glyceride. In column 3, lines 6–20, the provided amounts of fine powder of silicone resin and hydroxy-fatty acid glyceride in the metallization layer are required for adaptability to vacuum deposition. Example 3 provides a two-layer coextruded film in which the fine powder of crosslinked silicone resin is compounded with polypropylene homopolymer to form a metallization layer (B) and the fine powder of crosslinked silicone resin is compounded with an ethylene/propylene/butene- 1 copolymer to form a skin layer (a). The ratio of reported particle size to skin thickness is about 0.143 for skin layer (B) and about 1.29 for skin layer (A).

DESCRIPTION OF THE INVENTION

This invention provides a film which has low coefficient of friction, for good machinability, good heat sealability, low haze, good gloss (of unmetallized film), nonblocking properties, reduced appearance defects and good to excellent barrier properties.

More specifically, the invention provides a film structure which includes an olefinic polymer core layer having at least one skin layer comprising an olefin polymer having an external surface which is sealable and machinable, the layer containing a particulate slip/antiblock system which provide improved antiblock properties and reduced appearance defects. The particulate slip/antiblock system comprises non-migratory crosslinked hydrocarbyl-substituted polysiloxane particles and silica particles which together function as an improved slip/antiblock system. Particularly preferred particulate crosslinked hydrocarbyl-substituted polysiloxanes include the polymonoalkylsiloxanes.

On the other side of the olefin polymer core layer there is an olefinic polymer layer having an external surface which is free of the slip/antiblock system. The slip/antiblock system does not effect film barrier properties or lamination bond strengths to other oriented polypropylene based films or polyester based films. In one embodiment of the invention, this film surface is metallized. It is found that the slip/antiblock system of this invention reduces scratching of the metal surface when the film is wound into a roll.

Even more specifically, the invention relates to a film structure comprising a first skin layer (a) of an olefin co- or ter-polymer having an external surface which is sealable and machinable on one side of a core olefinic polymer layer (b), the first skin layer containing a slip/antiblock system comprising non-migratory crosslinked hydrocarbyl-substituted polysiloxane particles and silica particles, on an opposite side of the core layer there is a second skin layer (c) which includes an ethylene homopolymer which is free of the slip/antiblock system of the first skin layer, the second skin layer, optionally, having a metal deposited thereon.

The invention further relates to a method of making a film comprising the steps of coextruding a film structure, the film structure comprising a heat sealable layer (a) comprising an olefinic co- or terpolymer containing a slip/antiblock system comprising crosslinked hydrocarbyl-substituted polysiloxane particles and silica particles; a core layer (b) comprising an olefinic polymer and a layer (c) comprising an ethylene homopolymer which is free of the slip/antiblock system of layer (a); and, optionally, (2) metallizing the surface of the layer (c) by depositing a metal thereon.

By improved machinability it is meant that the film exhibits a low coefficient of friction and has improved anti-slip and non-blocking characteristics.

By improved appearance it is meant that the film exhibits reduced "blushing", the tendency of the unmetallized film to turn whitish and have a high concentration of scratches which occur during manufacturing processes; for example, when the film passes through the orienter and when it is wound into a roll. The appearance defects can be visible even after metallization. The metallizable film surface is less prone to scratching from contact with the surface of the sealant side which can scratching ordinarily tends to occur during machining operations and when the film is wound into a roll.

A particularly preferred polymer employed as the core layer of the film herein is polypropylene, particularly highly isotactic polypropylene. The preferred polypropylenes are well known in the art. Typically, they are formed by polymerizing propylene in the presence a stereospecific catalyst system. They can have a melt index at 230° C. ranging from about 0.1–25. The crystalline melting point is usually about 160° C. The number average molecular weight typically ranges from about 25,000 to 100,000. The density typically ranges from about 0.90–0.91.

For descriptive purpose only, the film structures of the present invention will be described as having an upper skin layer (a), a core layer (b) and a lower skin layer (c). As may be appreciated by those skilled in the art, the use of the terms upper and lower to refer to particular skin layers is merely relative. Moreover, although referred to as skin layers, the upper and lower layers may have additional structures bonded thereto, based on the functional requirements of the overall structure.

The polymer materials which are contemplated for use in forming skin layer (a) are suitably exemplified by heat sealable polyolefinic copolymers and terpolymers and blends thereof. The copolymers are exemplified by and include block copolymers, for example of ethylene and propylene, random copolymers, for example of ethylene and propylene. The terpolymers are exemplified by ethylene-propylene-butene-1 terpolymers. Also, heat sealable blends can be utilized in providing layer (a). Thus, along with the copolymer or terpolymer there can be polypropylene homopolymer, e.g. one which is the same as, or different from, the polypropylene homopolymer constituting core layer (b) or other material which does not impair the heat sealability of this layer.

Suitable ethylene-propylene-butene-1 (EPB) terpolymers are those obtained from the random inter-polymerization of from about 1 to about 8 weight percent ethylene, preferably from about 3 to about 7 weight percent ethylene with from about 1 to about 10 weight percent butene-1, preferably from about 2 to about 8 weight percent butene-1 with propylene representing the balance. The foregoing EPB terpolymers are for the most part characterized by a melt index at 230° C. of from about 2 to about 16 and advantageously from about 3 to about 7, a crystalline melting point of from about 100° C. to about 140° C., an average molecular weight of from about 25,000 to about 100,000 and a density within the range of from about 0.89 to about 0.92 gm/cm$^3$.

The ethylene-propylene (EP) random copolymers generally contain from about 2 to about 8 weight percent ethylene, specifically about 3 to about 7 weight percent ethylene, the balance being made up of propylene. The copolymers can have a melt index at 230° C. generally ranging from about 2 to about 15 and preferably from about 3 to about 8. The crystalline melting point is usually from about 125° C. to about 150° C. and the number average molecular weight range is from about 25,000 to 100,000. The density will usually range from about 0.89 to about 0.92 gm/cm$^3$.

In general, when blends of EPB terpolymer and EP random copolymer are used, such blends will contain from about 10 to about 90 weight percent EPB terpolymer and preferably from about 40 to about 60 weight percent EPB terpolymer, the balance being made up of EP random copolymer.

Prior to extrusion, in accordance with the present invention, the heat seal layer (a) is compounded with an effective amount of a slip/antiblock system. The slip/antiblock system comprises non-migratory slip agent and silica particles.

Preferred non-migratory slip agents are selected from the group of crosslinked hydrocarbyl-substituted polysiloxanes particles. Especially preferred are the particulate crosslinked polymonoalkylsiloxanes. Most particularly preferred are non-meltable polymonoalkylsiloxanes characterized as having a mean particle diameter of about 0.5 to about 20.0 $\mu$, typically determined by known scanning electron micrograph measurement techniques, and a three dimensional structure of siloxane linkages. Such materials are commercially available from Shin Etsu under various product designations and from Toshiba Silicone Co., Ltd., worldwide, and in the United States from General Electric Co., and are marketed under the tradename Tospearl. Particulate, spherical materials comprising acryl resins such as EPOSTAR manufactured by Nippon Shokubai Co., Ltd., are also contemplated. Other commercial sources of similar suitable materials are also known to exist. Especially preferred are the spherical particulates ranging in size from about 2 to about 5 $\mu$m. By non-migratory, it is meant that these particulates do not change location throughout the layers of the film in the manner of the migratory slip agents, e.g. polydialkylsiloxane or fatty amides. The amount employed typically ranges from about 0.01% to about 0.60% by weight, more specifically about 0.10% to about 0.04% by weight, based upon the entire weight of the skin layer resin.

The silica particles are finely divided inorganic silica antiblocking agent. Typically, the silica particles are used in amounts ranging from about 0.01 wt. % to about 0.40 wt. %, more specifically, about 0.05 wt. % to about 0.30 wt. % based on the entire weight of the skin layer. The silica particles can range, in average particle diameter size, from about 2 $\mu$m to about 8 $\mu$m, more specifically, from about 3 $\mu$m to about 5 $\mu$m. Size ranges are determined by known scanning electron micrograph measurement techniques. Appropriate silica antiblocking agent is commercially available from W. R. Grace and is sold under the trademark "SYLOBLOCK". Particularly appropriate versions are "SYLOBLOCK 42" "SYLOBLOCK 44" and "SYLOBLOCK 45". The silica particle component of the slip/antiblock system is, typically, amorphous and can contain additional inorganic materials such as aluminum and iron. Such contemplated materials are syloid, a synthetic amorphous silica gel, having a composition of about 99.7% SiO$_2$; diatomaceous earth having a composition of, for example, 92% SiO$_2$, 3.3% Al$_2$O$_3$, and 1.2% Fe$_2$O$_3$ which has an average particle size of about 5.5 microns, which particles are porous and irregularly shaped; and dehydrated kaolinite (Kaopolite SF) having a composition of 55% SiO$_2$, 44% Al$_2$O$_3$ and 0.14% Fe$_2$O$_3$. Synthetic, precipitated silicates, for example Sipernat 44, a material having a composition of 42% SiO$_2$, 36% Al$_2$O$_3$, and 22% Na$_2$O. are also contemplated. A mixture of silica and any of the foregoing inorganic silica-containing materials may be employed.

Regardless of the proportion of each component of the slip/antiblock system, it is contemplated that the total combined quantity of crosslinked hydrocarbyl substituted polysiloxane particles and silica antiblock particles of the slip/antiblock system, typically, ranges from about 0.02 to about 1.0 wt. %, specifically about 0.15 to about 0.7 wt. % based on the entire weight of the sealant skin layer.

Preferred for use in forming lower skin layer (c) are metallizable polymeric materials. Typical examples of such materials are those selected from the group consisting of ethylene polymers such as linear low density polyethylene (LLDPE), low density polyethylene (LDPE), medium density polyethylene (MDPE), high density polyethylene (HDPE) or blends thereof. Other contemplated metallizable resins which might not require the non-migratory slip agent for metal adhesion include ethylene-vinyl alcohol copolymer (EVOH), ethylene-vinyl acetate copolymer (EVA) and polypropylene homopolymer. High density polyethylene is a particularly preferred polymeric material for forming this skin layer. In general, the density ranges from between about 0.94 to 0.96 g/cm and over. This skin layer is formed without adding the slip/antiblock system, which is included in the formulation of skin layer (a). Thus, skin layer (c) is considered to be free of the slip/antiblock system used in skin layer (a). This does not however, exclude the incidental presence of components of the slip/antiblock system which might occur upon subsequent handling of the finished film, for example upon winding the film onto a roll, whereby non-migratory particulates or silica particles from skin layer (a) might be sloughed onto the external surface of or imbedded into skin layer (c). In one embodiment of the invention the skin layer (c) consists essentially of high density polyethylene.

Either or both layers (a) and (c) can also contain pigments, fillers, stabilizers, light protective agents or other suitable modifying ingredients if desired. Further, skin layers (a) and/or (c) can optionally contain a minor amount of an additional antiblock material, such as, clays, talc, glass, and the like. These antiblock materials can be used alone, or different sizes and shapes can be blended to optimize machinability. The major proportion of these particles, for example, anywhere from more than half to as high as 90 weight percent or more, will be of such a size that a significant portion of their surface area, will extend beyond the exposed surface of such skin layer.

Core layer (b) can contain anti-static agents, e.g., cocoamine or N,N bis(2-hydroxyethyl) sterylamine. Suitable amines include mono-, di, or tertiary amines.

Core layer (b) will usually represent from about 70 to about 95 percent of the thickness of the overall film laminate or an even higher percentage thereof. Typically, upper skin layer (a) and lower skin layer (c) are coextensively applied to each major surface of core layer (b), usually by being coextruded directly thereon.

In any event, in forming the three layer structure layers (a), (b) and (c) can be coextruded from a conventional extruder through a flat sheet die, the melt streams being combined in an adapter prior to being extruded from the die. Each of the skin layers (a) and (c) can comprise, for example, approximately 6.0% of the total thickness of the laminate. After leaving the die orifice, the laminate structure is chilled and the quenched sheet is then heated and stretched, e.g., five to eight times in the machine direction (MD) and then subsequently, for example, eight to twelve times in the transverse direction (TD). The edges of the film can be trimmed. The film laminate is then, usually, wound on a reel.

As a result of the biaxial orientation of the film structure herein, several physical properties of the composite layers, such as: flex-crack resistance, Elmendorff tear strength, elongation, tensile strength, impact strength and cold strength properties are improved.

The overall thickness of the laminate is not critical and advantageously can range from about 5 microns to about 60 microns.

When an opaque label or film structure is desired, the core layer of the film structure of the present invention may be formed in accordance with U.S. Pat. No. 4,377,616.

Where opacifying agents are desired, they may be incorporated in the core composition of this invention, in a proportion of up to about 10%, preferably at least about 1%, by weight. Suitable conventional opacifying agents can be added to the melt mixture of the core polymer before extrusion thereof into a film. Opacifying compounds are generally well known in this area. They may be exemplified by iron oxides, carbon black, aluminum, aluminum oxide, titanium dioxide, and talc.

The polyolefin blends used to coextrude the multi-layer high opacity film structures contemplated herein are suitably formed by employing commercially available intensive mixers, such as those of the Bolling or Banbury type.

In a preferred embodiment, the exposed surface of skin layer (c) is metallized. This occurs by application of a thin layer of metal. Metal deposition techniques are well known in the art. Typically, the metal layer is applied to an optical density of about 1.5 to about 5.0, specifically about 1.8 to about 2.6. Optical density provides a determination of the absorption of visual light and is determined by standard techniques. To obtain the optical density values of the instant films a commercial densitometer was used, such a Macbeth model TD 932, Tobias Densitometer model TDX or Macbeth model TD903. The denitometer is set to zero with no film specimen. A film specimen is placed over the aperture plate of the densitometer with the test surface facing upwards. The probe arm is pressed down and the resulting optical density value is recorded.

Usually vacuum deposition is the method of choice for metallizing the film. While aluminum is a contemplated metal, other metals, e.g. zinc, gold, silver, etc. which are capable of being deposited to the surface of the film can also be employed.

Typically, prior to metallization, the surface of skin layer (c) is treated to improve metal adhesion by corona or flame treatment.

The resulting metallized film has low water vapor transmission rate characteristics and low oxygen transmission rate characteristics. These improved physical properties make the film ideally suited for packaging food products, even those comprising liquids.

In one aspect of the invention, an important feature is the ratio of the thickness of the skin layer to the size of the particulate crosslinked hydrocarbyl-substituted polysiloxane. The typical ratio, in terms of average particulate size to skin thickness is from about 1.25 to about 5.00, specifically from about 1.60 to about 4.00. When the ratio of particulate to skin thickness is above about 2.5, the barrier properties of the film deteriorate. When the ratio is lower than about 1.5 machinability deteriorates. Particle size is determined by standard electron microscopy techniques.

In order to obtain a low coefficient of friction (e.g. lower than about 0.5 as determined by ASTM D 1894–78), a ratio of sealant skin thickness ($\mu$m) to crosslinked hydrocarbyl-substituted polysiloxane particle size ($\mu$m) is at least about 0.4, when the ratio of sealant skin thickness ($\mu$m) to silica particles ($\mu$m) is about 0.3. For example, with a sealant skin thickness of about 1.27 $\mu$m, the crosslinked hydrocarbyl-substituted polysiloxane particle sizes are at least 3 $\mu$m while the silica particles, on average, are about 4 $\mu$m.

EXAMPLES

The following specific examples demonstrate particular aspects of the present invention. Unless indicated to be on some other basis, all parts and percentages are by weight. Sizes of the polysiloxane particles are reported by the manufacturers as being determined by measuring the diameter of the particles by scanning electron micrograph.

Coefficient of friction values referred to herein are determined according to the procedure of ASTM D 1894-78, using TMI equipment (without delay). Friction was determined by contacting the seal layer to the sealant layer.

Haze and gloss values referred to herein are determined according to the procedures of ASTM D 1003-61 and D 2457-70, respectively.

Examples 1–2

In these examples a coextruded biaxially oriented film structure is produced in which the first skin layer contains two different loadings of polysiloxane.

Example 1

A core layer of polypropylene is coextruded with an ethylene-propylene copolymer sealant layer (sold by Fina under the product designation EOD-94-2 1) containing 1500 ppm of (0.15% by weight) non-migratory particulate crosslinked hydrocarbyl-substituted polysiloxane slip agent (sold by Shin Etsu under the product designation KMP-590). The average diameter of the particulates is about 2.0 $\mu$m. On the other side of the core layer, a high density polyethylene metallizable skin layer (sold by Exxon under the product designation HXO353.67) is coextruded. The film is oriented 5 times in the machine direction and 8 times in the transverse direction. The final film has a thickness of about 17.78 microns. The seal skin layer thickness is about 1.25 $\mu$m while the high density polyethylene skin thickness is about 0.5 $\mu$m.

Example 2

A film identical to the film of Example 1 is produced except that the amount of non-migratory particulate crosslinked hydrocarbyl substituted polysiloxane is 3000 ppm (0.3% by weight).

Examples 3–5

In these examples two film samples are made as described in Example 1 except that a the ethylene-propylene copolymer includes a particulate slip/antiblock system of non-migratory particulate crosslinked hydrocarbyl-substituted polysiloxane slip agent and inorganic silica antiblock having an average particle diameter of about 4 $\mu$m (sold by W. R. Grace under the product designation SYLOBLOCK 44).

In Example 3 the particulate loading is 2300 ppm (0.23 wt. %) particulate crosslinked hydrocarbyl-substituted polysiloxane slip agent of about 2.0 $\mu$m particle size (Shin Etsu 52-1186) and 1000 ppm (0.10 wt. %) silica antiblock.

In Example 4 the particulate loading is 2300 ppm (0.23 wt. %) particulate crosslinked hydrocarbyl-substituted polysiloxane slip agent of about 2.0 $\mu$m particle size (Shin Etsu KMP-590) and 1000 ppm (0.10 wt. %) silica antiblock.

In Example 5 the film of Example 4 was modified by adding 2000 ppm (0.20 wt. %) silica antiblock.

The high density polyethylene side of the film of each example was surface treated by flame treatment. The performance of each unmetallized film, which was tested immediately following orientation, is reported in Table 1.

TABLE 1

| Example | Silica (wt. %) | polysiloxane slip agent (wt. %)/($\mu$m) | MST (° F.)/(° C.) | COF* static/kinetic | % Haze | % Gloss |
|---|---|---|---|---|---|---|
| 1 | 0 | 0.15/2 | 206/97 | 0.57/0.52 | 1.85 | 94.4 |
| 2 | 0 | 0.30/2 | 209/98 | 0.50/0.46 | 2.55 | 90.5 |
| 3 | 0.10 | 0.23/3 | 208/96 | 0.53/0.37 | 1.87 | 90.0 |
| 4 | 0.10 | 0.23/2 | 204/96 | 0.78/0.76 | 2.10 | 89.8 |
| 5 | 0.20 | 0.23/2 | 207/97 | 0.84/0.78 | 2.30 | 88.7 |

*coefficient of friction between the seal layer and the metallizable layer

Comparing film performance during machining, the films of Examples 1 and 2 exhibited areas of blocking or adhesion of the wound film and occasional appearance defects manifested in "blushing" or medium-to-heavy scratch marks on the metallized film surface. The films of Examples 3 to 5 demonstrated significantly improved blocking of the wound film and a significantly improved appearance. The films of Examples 4 and 5 demonstrated a higher coefficient of friction than the film of Example 3 (in which the polysiloxane particles were larger). From this it follows that the larger particle size of the polysiloxane slip provides an advantage over the smaller particle size in the slip/antiblock system of the invention when reduced coefficient of friction is important.

What is claimed is:

1. A film structure comprising a first skin layer (a) having a sealable external surface which comprises a slip/antiblock system which comprises non-migratory crosslinked hydrocarbyl substituted polysiloxane particles and silica particles, the skin layer (a) being on one side of a core olefinic polymer layer (b), and on an opposite side of the core layer (b), a second skin layer (c) which is an ethylene homopolymer which is free of the slip/antiblock system of the first skin layer (a).

2. The film structure of claim 1 in which the particulate crosslinked hydrocarbyl-substituted polysiloxane of layer (a) is a crosslinked polymonoalkylsiloxane.

3. The film structure of claim 2 in which the particulate crosslinked non-meltable polymonoalkylsiloxane is characterized as having an average particle diameter of about 0.5 to about 20 microns.

4. The film structure of claim 1 in which the first skin layer comprises a propylene co- or terpolymer.

5. The film structure of claim 4 in which the second skin layer (c) comprises ethylene.

6. The film structure of claim 5 in which the second skin layer (c) comprises medium or high density polyethylene.

7. The film structure of claim 5 in which the olefinic polymer of the core layer is polypropylene.

8. The film structure of claim 1 in which the quantity of particulate crosslinked hydrocarbyl substituted polysiloxanes and silica antiblock particles of the slip/antiblock system ranges from about 0.02 to about 1.0 wt. % based on the entire weight of the skin layer (a).

9. The film structure of claim 1 further comprising a metal deposited onto an external surface of the second skin layer (c).

10. The film structure of claim 9 in which the metal is aluminum.

* * * * *